United States Patent [19]

Saito et al.

[11] Patent Number: 5,373,073
[45] Date of Patent: * Dec. 13, 1994

[54] PROCESS FOR THE PREPARATION OF 1-MONOALKYL DIMETHYLSILYLPROPYNE POLYMERS

[75] Inventors: Yukihiro Saito, Kawasaki; Katsunori Waragai, Sagamihara; Shiro Asakawa, Tokyo, all of Japan

[73] Assignee: Matsushita Electric Industrial Co., Ltd., Osaka, Japan

[*] Notice: The portion of the term of this patent subsequent to Sep. 22, 2007 has been disclaimed.

[21] Appl. No.: 941,605

[22] Filed: Sep. 8, 1992

Related U.S. Application Data

[63] Continuation-in-part of Ser. No. 402,419, Sep. 5, 1989, Pat. No. 5,149,751.

[30] Foreign Application Priority Data

Sep. 5, 1988 [JP] Japan ................................ 63-221712

[51] Int. Cl.⁵ .......................... C08G 77/04; C08F 4/58
[52] U.S. Cl. ...................... 526/178; 526/128; 526/221; 528/14; 528/19; 528/31
[58] Field of Search ..................... 526/178, 128, 221; 528/14, 19, 31

[56] References Cited

U.S. PATENT DOCUMENTS 4,755,193  7/1988  Higashimura et al. .................. 55/16

FOREIGN PATENT DOCUMENTS 59-155409  9/1984  Japan .
1083251  4/1986  Japan .

OTHER PUBLICATIONS

"Gas Permeability of Polyacetylenes Carrying Substituents", by Higashimura et al; Journal of Applied Polymer Science, vol. 30, pp. 1605–1616 (1985).

"Macromolecules", vol. 17, No. 2, Feb. 1984, pp. 126–129, American Chemical Society, Washington, US, T. Masuda et al.

"Polymerization of 1-chloro-2-phenylacetylene by MoCl5-based Catalysts", Department of Polymer Chemistry, Kyoto University, Apr., 1983, T. Masuda et al.

"Accounts of Chemical Research", vol. 17, 1984, pp. 51–56, American Chemical Society, Washington, US, Synthesis of High Polymers from Substituted Acetylenes: Exploitation of Molybdenum- and Tungsten-Based Catalysts, T. Masuda.

*Primary Examiner*—Tae H. Yoon
*Attorney, Agent, or Firm*—Lowe, Price, LeBlanc & Becker

[57] ABSTRACT

A process for the preparation of 1-monoalkyl($C_1$–$C_4$) dimethylsilyl-1-propyne polymers which comprises polymerizing a 1-monoalkyl ($C_1$–$C_4$)dimethylsilyl-1-propyne monomer in the presence of a compound of a transition metal and a member selected from $\alpha,\omega$-dihydropolydialkylsiloxanes and polyalkylhydrosiloxanes in a solvent inert to the polymerization. The polymerization reaction proceeds at low temperatures in an efficient manner. Membranes of the resultant polymer have a high gas transmission and suffer but little degradation when placed under severe temperature conditions.

15 Claims, No Drawings

PROCESS FOR THE PREPARATION OF 1-MONOALKYL DIMETHYLSILYLPROPYNE POLYMERS

CROSS-REFERENCE TO RELATED APPLICATIONS

This application is a continuation-in-part of application serial No. 07/402,419, filed on Sep. 5, 1989.

FIELD OF THE INVENTION

This invention relates to a process for the polymerization of 1-monoalkyl($C_1$–$C_4$)dimethylsilyl-1-propynes.

BACKGROUND ART

A variety of processes for the preparation of polymers of acetylene compounds have been known and investigated. These processes commonly have several problems such as difficulty in obtaining high molecular weight polymers and low yield.

On the other hand, few studies on the polymerization of 1-monoalkyldimethylsilyl-1-propynes which are one of di-substituted acetylene compounds have been made since they have poor reactivity. In recent years, however, Higashimura et al developed catalysts effective for obtaining high molecular weight polymers of the propynes. This is known from U.S. Pat. No. 4,755,193 and Japanese Laid-open Patent Application No. 59-155409. In these publications, it is stated that polymers of 1-monoalkyl($C_1$–$C_4$)dimethylsilyl-1-propynes are obtained by polymerization of 1-monoalkyl($C_1$–$C_4$)dimethylsilyl1-propynes in the presence of a transition metal compound of Group V of the Periodic Table. In this process, a relatively high polymerization temperature is used ranging from 30° to 100° C., within which the higher temperature is favored and a long reaction time of from 12 to 36 hours is necessary. The 1-trimethylsilyl-1-propyne polymer obtained by the above process has a very high gas permeability but its characteristic properties degraded considerably. This is reported by Higashimura et al (Journal of Applied Polymer Science, JAPS, Vol. 30, p. 1655, 1985). According to this literature, when the polymer is thermally treated at 100° C. for about 5 hours, the oxygen permeability coefficient ($P_{O_2}$) is reduced to 1/5 of the initial value.

SUMMARY OF THE INVENTION

It is accordingly an object of the invention to provide a process for the polymerization of 1-monoalkyl($C_1$–$C_4$)dimethylsilyl-1-propyne, which overcomes the drawbacks of the prior art process and wherein the resultant polymer exhibits stable gas permeability with a much reduced degree of degradation of its characteristic properties.

It is another object of the invention to provide a process for the preparation of 1-monoalkyl($C_1$–$C_4$)dimethylsilyl-1-propyne polymers wherein the polymers are efficiently obtained at relatively low temperatures within a shorter time than in the prior art process.

The polymerization reaction is performed in a solvent. Examples of the solvent include aromatic hydrocarbons such as benzene, toluene, xylene and the like; halogenated hydrocarbon such as 1,2-dichloroethane, carbon tetrachloride, chloroform, 1,2,3-trichloropropane, trichloroethylene, chlorobenzene and the like; alicyclic hydrocarbons such as cyclohexane, cyclohexene and the like, and mixtures thereof. The monomer concentration in the polymerization reaction is generally from 0.1 to 2 moles per liter of the solvent, preferably from 0.3 to 1 mile per liter of the solvent.

The order of addition of the solvent, monomer, compound of a transition metal of Group V and $\alpha,\omega$-dihydropolydialkylsiloxane and polyalkylhydrosiloxane is not critical. In general, a transition metal compound and an $\alpha,\omega$-dihydropolydialkylsiloxane and/or polyalkylhydrosiloxane are first added to a solvent in predetermined amounts and heated to about 60° C. for 5 to 15 minutes. During this treatment, it is assumed that the transition metal is reduced with the hydrogen bonded to the silicon atoms of the siloxane compound or polymer, thereby forming a reaction product serving as a polymerization initiator. Thereafter, the mixture is cooled down to about 0° C., to which a predetermined amount of monomer is added. The polymerization reaction may proceed at temperatures not higher than 0° C. and is completed in about 1 hour to several hours at a temperature of 30° C. The reaction temperature is generally in the range of from 0 to 80° C., preferably from 30 to 70° C. Higher temperatures may be used but are not economical.

Alternatively, an $\alpha,\omega$-dihydropolydialkylsiloxane and/or polyalkylhydrosiloxane may be added after keeping a solution of the monomer and the transition metal compound at a given temperature sufficient to cause the reaction between the transition metal and the siloxane.

The reaction solution obtained after completion of the polymerization may be purified by a so-called re-precipitation technique wherein the solution is added to a large amount of a poor solvent thereby precipitating the resultant polymer. Examples of the poor solvent include alcohols such as methanol, ethanol and the like.

It will be noted that although the polymerization may be effected in an atmosphere of air, it is usually effected in an atmosphere of an inert gas such as nitrogen.

The polymer obtained by the polymerization process of the invention is very high in molecular weight, e.g., not only does the polymerization reaction solution become very viscous, but the reaction may also proceed to an extent where a solid product is obtained. In the latter case, the reaction system is diluted with a solvent and subjected to re-precipitation.

The gel permeation chromatography of the polymer reveals that its weight average molecular weight ($\overline{M}w$) is about 1,000,000 or over.

The polymer obtained by the above process is film-forming. When the film obtained from the polymer is thermally treated at 100° C. for 5 hours as reported by Higashimura et al set out above, the oxygen permeability coefficient undergoes but little degradation. The reason for this is not clear. Several factors may be considered including a structural change of the polymer because of the presence of an $\alpha,\omega$-dihydropolydialkylsiloxane and/or polyalkylhydrosiloxane in the reaction system, a change in the cis-trans structure of the double bonds in the propyne compound owing to the polymerization reaction at low temperatures, e.g. at room temperature, and a very high degree of polymerization taking place. In any event, the final polymer product has a high gas permeability and a very small degree of characteristic degradation, thus being useful in practical applications. The polymers obtained by the process of the invention have utility not only as a gas permeation membrane, but also as electronic and insulating materials.

The present invention is more particularly described by way of examples,

EXAMPLES 1-6

200 ml of purified toluene, 2 mmols of tantalum pentachloride ($TaCl_5$) as a compound of a metal of Group V and 0.5 g of polyalkylhydrosiloxane (SH-1107, available from Toray Silicone Co., Ltd.) were charged in an atmosphere of dry nitrogen onto a three-necked flask equipped with an agitator, a thermometer and a separatory funnel and having a capacity of 300 ml, followed by heating to 60° C. for 10 minutes. Thereafter, the mixture was cooled down to 0° C. (ice bath), and then 0.2 moles of 1-trimethylsilyl-1-propyne was added, followed by polymerization for 3 hours under agitation. A very viscous polymer solution was charged into a large amount of methanol to obtain a polymer precipitate.

The thus obtained polymer was purified by reprecipitation, after which the molecular weight and gas permeation characteristic were measured. As a result, the weight average molecular weight was 1,200,000 when determined by gel permeation chromatography using polystyrene as a reference and the oxygen gas permeability coefficient was $1.46 \times 10^{-6}$ cc.cm/cm².sec.cmHg.

The above procedure was repeated using different transition metal compounds and/or different polyalkylhydrosiloxane as shown in Examples 2-6. The results are shown in the table below.

TABLE

| Example | Transition Metal Compound | Polymethyl-hydro-siloxane | Weight Average Molecular Weight Mw | $\overline{P_{O_2}}$*1 |
|---|---|---|---|---|
| 1 | $TaCl_5$ | SH-1107 | 1,200,000 | $1.46 \times 10^{-6}$ |
| 2 | $NbCl_5$ | SH-1107 | 1,200,000 | $8.6 \times 10^{-7}$ |
| 3 | $NbBr_5$ | SH-1107 | 1,000,000 | $7.6 \times 10^{-7}$ |
| 4 | $TaCl_5$ | KF-99*2 | 1,500,000 | $1.6 \times 10^{-6}$ |
| 5 | $TaCl_5$ | $H-\underset{\underset{CH_3}{\mid}}{\overset{\overset{CH_3}{\mid}}{Si}}-O-\underset{\underset{CH_3}{\mid}}{\overset{\overset{CH_3}{\mid}}{Si}}-H$ | 1,100,000 | $1.2 \times 10^{-6}$ |
| 6 | $TaCl_5$ | PS 120*3 | 2,000,000 | $2.0 \times 10^{-6}$ |

Note
*1 oxygen permeability coefficient (cc · cm/cm² · sec · cmHg)
*2 KF 99 is a polymethylhydrosiloxane available from Sin-Etsu Silicone Co., Ltd.
*3 PS 120 is a polymethylhydrosiloxane available from Chisso Co., Ltd.

Similar results were obtained when the general procedure of the above examples was repeated using polydimethylsiloxane terminated with hydrogen at both ends (PS-537, available from Petrarch System, Inc., of U.S.A.).

What is claimed is:

1. A process for the preparation of 1-monoalkyl ($C_1$-$C_4$)dimethylsilyl-1-propyne polymers which comprises polymerizing a 1-monoalkyl($C_1$-$C_4$)dimethylsilyl-1-propyne monomer in the presence of a compound of a transition metal of Group V of the Periodic Table and a member selected from the group consisting of α,ω-dihydropolydialkylsiloxanes and polyalkylhydrosiloxanes in a solvent inert to the polymerization.

2. A process according to claim 1, wherein said 1-monoalkyl($C_1$-$C_4$)dimethylsilyl-1-propyne monomer is trimethylsilyl-1-propyne.

3. A process according to claim 1, wherein said compound is a halide of a transition metal.

4. A process according to claim 1, wherein said transition metal compound is used in an amount of from 0.01 to 10 mole % based on the monomer.

5. A process according to claim 1, wherein said member is an α,ω-dihydropolydialkylsiloxane of the following formula:

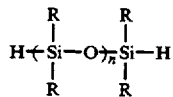

wherein each R represents an alkyl group having 1 to 8 carbon atoms, and n is an integer of 1 to 8.

6. A process according to claim 5, wherein the siloxane is used in an amount of from 1 to 10 mole %, as the hydrogen atom bonded directly to the silicon atoms at both ends based on the monomer.

7. A process according to claim 5, wherein each R is a methyl group.

8. A process according to claim 1, wherein said member is a polyalkylhydrosiloxane of the following formula:

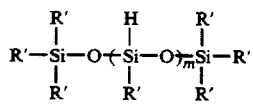

wherein each R' represents an alkyl group having 1 to 8 carbon atoms and m is an integer of not less than 1.

9. A process according to claim 8, wherein said polyalkylhydrosiloxane is used in an amount of from 1 to 10 mole %, as the hydrogen atom bonded directly to the silicon atom or atoms, based on the monomer.

10. A process according to claim 8, wherein each R' is a methyl group.

11. A process according to claim 1, wherein the polymerization is effected at a temperature of from 0° to 80° C.

12. A process according to claim 11, wherein the temperature is from 30° to 70° C.

13. A process according to claim 1, wherein said compound and said member are first added to the solvent and heated up to 60° C. and cooled, after which said monomer is polymerized.

14. A process according to claim 1, further comprising charging the resultant reaction solution into a large amount of a poor solvent, thereby precipitating a polymer formed by the polymerization.

15. A process according to claim 1, wherein the monomer is added in an amount of 0.1 to 2 moles per liter of the solvent.

* * * * *

UNITED STATES PATENT AND TRADEMARK OFFICE
CERTIFICATE OF CORRECTION

PATENT NO. : 5,373,073
DATED : December 13, 1994
INVENTOR(S) : Yukihiro SAITO et al.

It is certified that error appears in the above-indentified patent and that said Letters Patent is hereby corrected as shown below:

On cover page delete item "[*]" and insert:

--[*] Notice: The portion of the term of this patent subsequent to Sep. 22, 2009 has been disclaimed.--

Signed and Sealed this

Fourteenth Day of March, 1995

Attest:

BRUCE LEHMAN

*Attesting Officer*     *Commissioner of Patents and Trademarks*